United States Patent
Fukuda

(10) Patent No.: US 10,732,955 B2
(45) Date of Patent: Aug. 4, 2020

(54) ELECTRONIC APPARATUS AND INFORMATION PROCESSING SYSTEM

(71) Applicants: Kabushiki Kaisha Toshiba, Minato-ku (JP); Toshiba Infrastructure Systems & Solutions Corporation, Kawasaki-shi (JP)

(72) Inventor: Aki Fukuda, Yokohama (JP)

(73) Assignees: Kabushiki Kaisha Toshiba, Minato-ku (JP); Toshiba Infrastructure Systems & Solutions Corporation, Kawasaki-shi (JP)

( * ) Notice: Subject to any disclaimer, the term of this patent is extended or adjusted under 35 U.S.C. 154(b) by 0 days.

(21) Appl. No.: 15/867,837

(22) Filed: Jan. 11, 2018

(65) Prior Publication Data

US 2018/0196661 A1 Jul. 12, 2018

(30) Foreign Application Priority Data

Jan. 12, 2017 (JP) .................. 2017-003143

(51) Int. Cl.
  *G06F 8/65* (2018.01)
  *G06F 21/44* (2013.01)
  *G06F 16/23* (2019.01)

(52) U.S. Cl.
  CPC .............. *G06F 8/65* (2013.01); *G06F 8/66* (2013.01); *G06F 16/2365* (2019.01); *G06F 21/44* (2013.01)

(58) Field of Classification Search
  None
  See application file for complete search history.

(56) References Cited

U.S. PATENT DOCUMENTS

| | | | | |
|---|---|---|---|---|
| 6,647,016 B1 * | 11/2003 | Isoda | ............... | G06F 13/122 370/412 |
| 7,596,721 B1 * | 9/2009 | Flake | ............... | G06F 8/66 714/42 |
| 8,468,516 B1 * | 6/2013 | Chen | ............... | G06F 8/656 717/170 |

(Continued)

FOREIGN PATENT DOCUMENTS

| | | |
|---|---|---|
| EP | 2 453 391 A1 | 5/2012 |
| JP | 6-44078 | 2/1994 |

(Continued)

OTHER PUBLICATIONS

Partial Search Report dated May 23, 2018 in European Patent Application No. 18151206.2.

*Primary Examiner* — Wei Y Zhen
*Assistant Examiner* — Binh Luu
(74) *Attorney, Agent, or Firm* — Oblon, McClelland, Maier & Neustadt, L.L.P.

(57) ABSTRACT

An electronic apparatus has a communication unit, a first storage unit, a second storage unit, and a controller. The communication unit communicates with a terminal apparatus. The first storage unit stores a first program. The second unit stores a patch program for the first program received from the terminal apparatus via the communication unit for each section. When executing the first program, the controller applies the latest patch program stored in each section in the second storage unit.

12 Claims, 7 Drawing Sheets

(56) References Cited

U.S. PATENT DOCUMENTS

| | | | |
|---|---|---|---|
| 2002/0112200 A1* | 8/2002 | Hines | G06F 8/66 714/38.11 |
| 2002/0138700 A1* | 9/2002 | Holmberg | G06F 9/3802 711/137 |
| 2004/0181631 A1* | 9/2004 | Clegg | G06F 12/0864 711/128 |
| 2004/0210653 A1* | 10/2004 | Kapoor | G06F 8/65 709/223 |
| 2006/0048130 A1* | 3/2006 | Napier | G06F 8/65 717/168 |
| 2006/0265630 A1* | 11/2006 | Alberti | G06F 8/65 714/38.12 |
| 2007/0106980 A1* | 5/2007 | Felts | G06F 8/65 717/124 |
| 2007/0113064 A1* | 5/2007 | Wei | G06F 21/575 713/1 |
| 2007/0239938 A1* | 10/2007 | Pong | G06F 12/0846 711/122 |
| 2008/0022380 A1* | 1/2008 | Lu | G06F 8/65 726/9 |
| 2008/0077753 A1* | 3/2008 | Yoshida | G06F 11/1076 711/154 |
| 2008/0237333 A1* | 10/2008 | Fukuda | G06F 21/77 235/375 |
| 2010/0175067 A1* | 7/2010 | Appe | G06F 9/4881 718/103 |
| 2011/0016329 A1* | 1/2011 | Pepin | G06F 8/65 713/189 |
| 2012/0054425 A1* | 3/2012 | Matas | G06F 12/0837 711/105 |
| 2012/0067947 A1* | 3/2012 | Fukuda | G06K 19/0723 235/380 |
| 2014/0258675 A1* | 9/2014 | Takeuchi | G06F 3/0614 711/206 |
| 2018/0275875 A1* | 9/2018 | Yonezawa | G06F 3/0626 |

FOREIGN PATENT DOCUMENTS

| | | |
|---|---|---|
| JP | 7-84775 | 3/1995 |
| JP | 2002-49904 | 2/2002 |
| WO | WO 2007/138442 A1 | 12/2007 |

* cited by examiner

ELECTRONIC APPARATUS AND INFORMATION PROCESSING SYSTEM

CROSS-REFERENCE TO RELATED APPLICATION

This application is based upon and claims the benefit of priority from the prior Japanese Patent Application No. 2017-003143, filed on Jan. 12, 2017, the entire contents of which are incorporated herein by reference.

FIELD

Embodiments of the present invention relate to an electronic apparatus and an information processing system.

BACKGROUND

Conventionally, with regard to an IC card such as a Java Card (registered trademark), there are technologies that are capable of adding or deleting application programs. However, in conventional technologies, it is not possible for an IC card to modify programs such as an OS. There is a problem with a conventional IC card in that, in the case where a patch program is applied to fix a bug in a software program during operation, if a disturbance such as power interruption occurs, the patch program may not be applied correctly.

DETAILED DESCRIPTION

According to an embodiment, an electronic apparatus has a communication unit, a first storage unit, a second storage unit, and a controller. The communication unit communicates with a terminal apparatus. The first storage unit stores a first program. The second storage unit stores a patch program for the first program received from the terminal apparatus via the communication unit for each section. When executing the first program, the controller applies the latest patch program stored in each section in the second storage unit.

In the following, an embodiment will be described with reference to the drawings.

Figure 1:
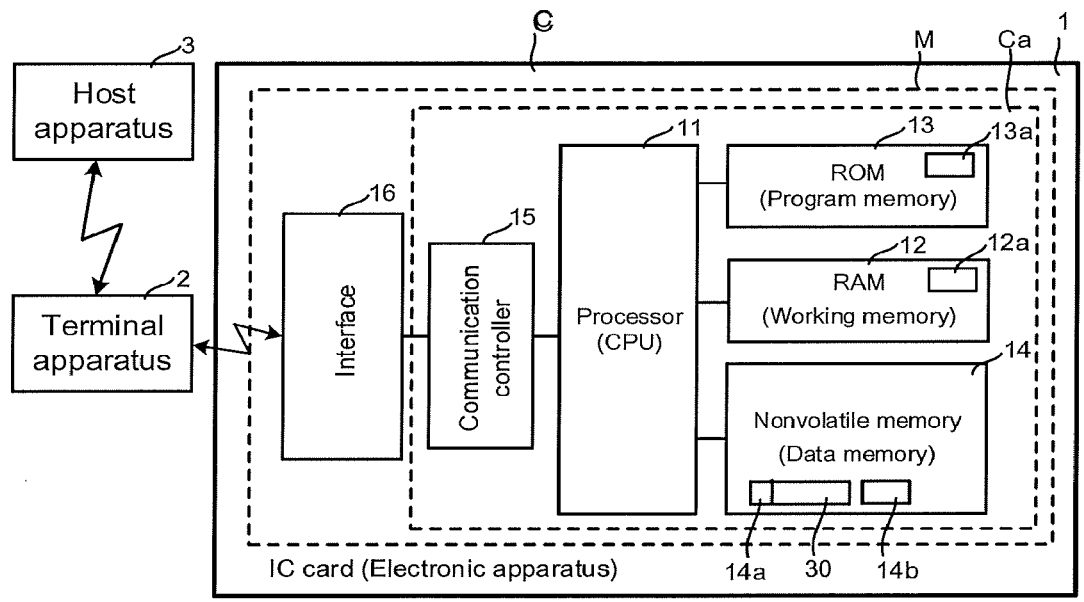
FIG. 1 is a diagram showing an information processing system according to an embodiment, in particular, showing a configuration example of an IC card.

FIG. 1 is a diagram showing an information processing system according to an embodiment, and is, in particular, a block diagram schematically showing a configuration example of an IC card 1.

The information processing system according to the embodiment has the IC card (electronic apparatus) 1, a terminal apparatus (IC card processing apparatus) 2, and a host apparatus 3. The IC card communicates with the terminal apparatus 2, and the terminal apparatus 2 communicates with the host apparatus 3.

The host apparatus 3 is connected to, for example, the terminal apparatus 2 via a network. The host apparatus 3 is an apparatus that transmits information such as a server on a network or a transmission source of a communication system. The host apparatus 3 outputs a patch program (described in detail later) for the IC card 1 to the terminal apparatus 2.

The terminal apparatus 2 has a function of communicating with the host apparatus 3, and a function of communicating with the IC card 1. The terminal apparatus 2 supplies the patch program supplied from the host apparatus 3 to the IC card 1. The IC card 1 is communicatively connected to the terminal apparatus 2.

The IC card 1 is an electronic apparatus having a function of communicating with the terminal apparatus 2 and a function of executing programs. The IC card 1 applies the patch program supplied from the host apparatus 3 via the terminal apparatus 2.

The following embodiment will be described assuming that the IC card 1 is a contact-type or a contactless-type IC card, which operates according to commands from the terminal apparatus 2, and the terminal apparatus 2 is an IC card processing apparatus (IC card reader/writer (R/W)). Note that the IC card 1 may also be an electronic apparatus other than a contact-type or a contactless-type IC card, and the terminal apparatus 2 may also be any apparatus that can be communicatively connected to an interface of an electronic apparatus other than an IC card. For example, in the information processing system according to the embodiment, the IC card 1 may also be a small electronic device mounted on the terminal apparatus 2. In addition, the host apparatus 3 is the transmission source of the patch program for the IC card 1 in the information processing system, and may be a personal computer (PC), a server, or a transmission apparatus of a broadcast communication system.

In other words, the IC card 1 is a portable electronic device which is activated (becomes operational) by power supplied from the terminal apparatus 2. The IC card 1 operates according to a command from the terminal apparatus 2. The IC card 1 is also called a smart card. The IC card 1 is a contact-type IC card (contact IC card) or a contactless-type IC card (contactless IC card). The IC card 1 serving as the contact IC card is activated by being supplied with operating power and an operating clock from the terminal apparatus 2 via a contact unit serving as a communication interface. The IC card 1 serving as the contactless IC card is activated by receiving a radio wave from the terminal apparatus 2 via an antenna serving as the communication interface, a modulation/demodulation circuit, and the like, and generating operating power and an operating clock from the radio wave.

As shown in FIG. 1, the IC card 1 has a main body C. The main body C is made of a plastic or the like, and is formed to be card-shaped. The IC card 1 has a module M within the main body C. In the module M, one or more IC chips Ca and an external interface (interface) for communication are integrally formed in a connected state, and the module M is embedded in the main body C. Moreover, as shown in FIG. 1, the module M has a processor 11, a RAM 12, a ROM 13, a nonvolatile memory 14, a communication controller 15, an interface 16 and the like.

The processor 11 includes a hardware circuit that performs various types of processing. The processor 11 may be a CPU (Central Processing Unit), for example. The processor 11 performs overall control of the IC card 1. In other words, the processor 11 is a controller. The processor 11 realizes various processing functions by executing programs stored in the ROM 13 or the nonvolatile memory 14. However, the various functions executed by the processor 11, which will be described later, may also be partly or entirely realized by a hardware circuit.

The RAM 12 is a volatile memory that functions as a working memory. The RAM 12 also functions as a buffer that temporarily stores data and the like undergoing processing by the processor 11. For example, the RAM 12 is provided with a communication buffer (transmit/receive buffer) that temporarily stores data to be transmitted to and data received from the terminal apparatus 2 via the communication controller 15 and the interface 16. The communication buffer provided in the RAM 12 is constituted by a transmit buffer that stores data to be transmitted and a receive buffer that stores received data. Moreover, the RAM 12 also stores various types of control information for defining the communication buffer. Furthermore, the RAM 12 has a storage region 12a for storing a session key used for a secure messaging, which will be described later.

The ROM 13 is a nonvolatile memory that functions as a program memory. Control programs, control data, and the like are preliminarily stored in the ROM 13. The ROM 13 is incorporated into the IC card 1 at the manufacturing stage in a state in which the control programs, the control data, and the like are stored therein. In other words, the control programs and the control data stored in the ROM 13 are preliminarily incorporated in accordance with the specifications of the IC card 1. For example, the ROM 13 stores a program for the processor 11 to execute processing corresponding to a command received from the terminal apparatus 2. In the present embodiment, the ROM 13 has a storage region 13a for storing a program (a first program) to which a patch program, which will be described later, is applied.

The nonvolatile memory 14 is a nonvolatile memory to which data can be written and rewritten. The nonvolatile memory 14 is configured by, for example, an EEPROM (registered trademark) (Electrically Erasable Programmable Read Only Memory), a flash ROM, or the like. Programs corresponding to the application of the IC card 1 and various types of data are written to the nonvolatile memory 14.

Moreover, a portion or the entirety of the region of the nonvolatile memory 14 is tamper-resistant, and data can be securely stored therein. In the nonvolatile memory 14, program files, data files, or the like are defined, and control programs and various types of setting data are written into those files. For example, the nonvolatile memory 14 stores various setting data for communication control, user data, application programs, and the like. The nonvolatile memory 14 has a section management table 14a, which will be described later. In addition, the nonvolatile memory 14 may also be provided with a storage region 14b for storing a fixed key that is used in secure messaging.

The communication controller 15 is connected to the interface 16. The interface 16 is an interface for communicatively connecting to the external apparatus. The communication controller 15 and the interface 16 constitute a communication unit. The communication controller 15 and the interface 16 realize a communication function that uses a communication method corresponding to an interface of the terminal apparatus 2. Moreover, the communication controller 15 and the interface 16 may also be configured to support a plurality of communication methods (e.g., contact communication and contactless communication).

In the case where the IC card 1 is realized as a contact IC card, the communication controller 15 and the interface 16 constitute a communication unit that communicates with the terminal apparatus 2 through contact therewith. In this case, the interface 16 is constituted by a contact unit that can be brought into physical and electrical contact with a contact unit of the terminal apparatus 2, and the communication controller 15 is constituted by a circuit or the like that controls transmission and reception of signals via the contact unit.

Also, in the case where the IC card 1 is realized as a contactless IC card, the communication controller 15 and the interface 16 constitute a communication unit that communicates with a card reader/writer of the terminal apparatus 2 in a contactless (wireless) manner. In this case, the interface 16 is constituted by an antenna that transmits and receives radio waves, and the communication controller 15 is constituted by a modulation circuit for generating a radio wave to be transmitted, a demodulation circuit for generating a signal from a received radio wave, and the like.

Figure 2:
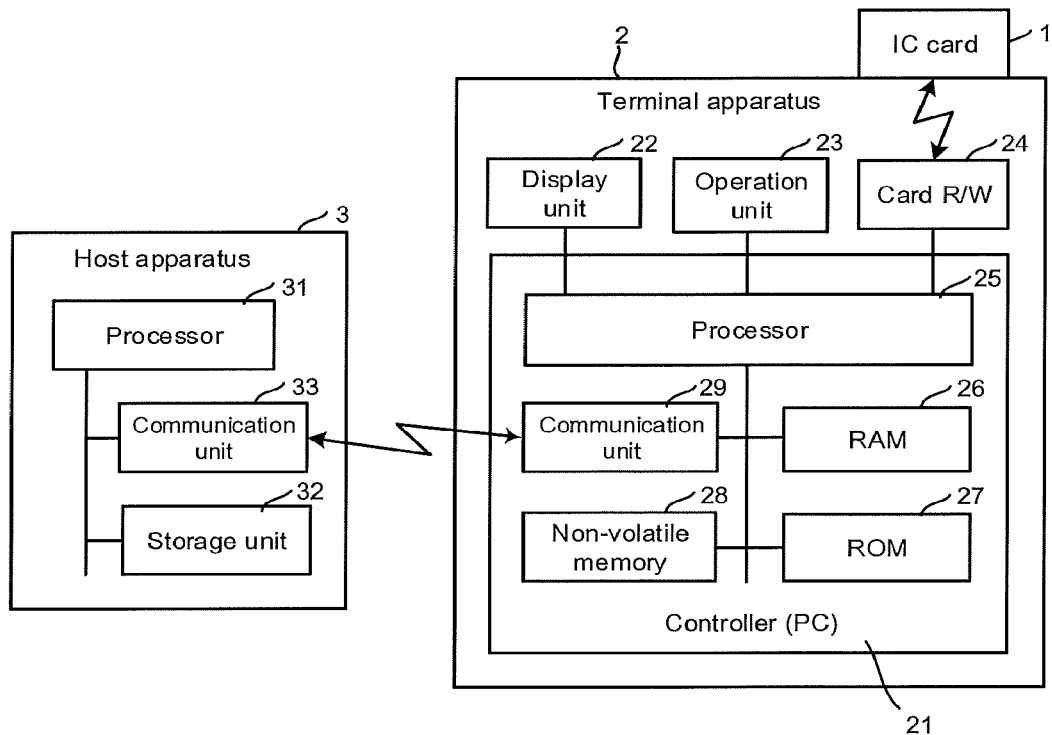
FIG. 2 is a diagram showing an information processing system according to the embodiment, in particular, showing a configuration example of a terminal apparatus and a host apparatus.

FIG. 2 is a block diagram schematically showing a configuration example of an information processing system according to the embodiment.

In the configuration example shown in FIG. 2, the terminal apparatus 2 of the information processing system is an IC card processing apparatus having a function of communicating with the IC card 1 via the card reader/writer, and a function of communicating with the host apparatus 3.

As shown in FIG. 2, the terminal apparatus 2 has a controller 21, a display unit 22, an operation unit 23, a card reader/writer 24, and the like.

The controller 21 controls the overall operation of the terminal apparatus 2. The controller 21 includes a hardware circuit that performs various types of processing. The controller 21 is constituted by a processor (CPU) 25, a RAM 26, a ROM 27, a nonvolatile memory 28, a communication unit 29, and the like. For example, the controller 21 is constituted by a personal computer (PC). The processor 25 executes various types of processing by executing programs stored in the ROM 27 or the nonvolatile memory 28. The RAM 26 functions as a working memory that temporarily stores data. The ROM 27 is a nonvolatile memory that stores programs, control data, and the like. The nonvolatile memory 28 is a rewritable nonvolatile memory. The communication unit 29 is an interface for communicating with the host apparatus 3.

The controller 21 has a function of transmitting commands to the IC card 1 using the card reader/writer 24, a function of performing various types of processing based on data received from the IC card 1, and other functions. For example, the controller 21 performs control for writing data to nonvolatile memories in the IC card 1 by transmitting a data write command to the IC card 1 via the card reader/ writer 24. Also, the controller 21 performs control to read data from the IC card 1 by transmitting a read command to the IC card 1. Also, the controller 21 has a function of executing a plurality of applications.

The display unit 22 is a display apparatus that displays various types of information under the control of the controller 21. The operating unit 23 is constituted by a keyboard, a numeric keypad, a pointing device, and the like. The operating unit 23 is a unit for allowing an operator of the terminal apparatus 2 to input various operating instructions, data, and the like. The operating unit 23 also functions as an input unit for inputting identification information of a user of the IC card 1 or authentication information such as a password.

The card reader/writer 24 is an interface apparatus for communicating with the IC card 1. The card reader/writer 24 is configured by an interface corresponding to the communication method of the IC card 1. For example, in the case where the IC card 1 is a contact-type IC card, the card reader/writer 24 is constituted by a contact unit for physically and electrically connecting to the contact unit of the IC card 1, and the like. In the case where the IC card 1 is a contactless-type IC card, the card reader/writer 24 is constituted by an antenna for performing wireless communication with the IC card 1, a communication controller, and the like. The card reader/writer 24 supplies power and a clock signal to the IC card 1, performs reset control of the IC card 1, and transmits and receives data to and from the IC card 1. Based on the control by the controller 21, the card reader/writer 24 activates (starts up) the IC card 1, transmits various commands, receives responses to the transmitted commands, and so on.

Also, the host apparatus 3 is an apparatus that is communicatively connected to the terminal apparatus 2. For example, the host apparatus 3 is a server connected to a communication unit 29 of the terminal apparatus 2 via a network. The communication unit 29 includes an interface. In addition, the host apparatus 3 may also be a personal computer (PC) or the like connected to the terminal apparatus 2.

In the configuration example shown in FIG. 2, the host apparatus 3 has a processor (CPU) 31, a storage unit 32, and a communication unit 33, and the like. The processor 31 executes various processing as the host apparatus 3 by executing programs stored in the storage unit 32. The storage unit 32 has a RAM, a ROM, a rewritable nonvolatile memory, and the like. The storage unit 32 stores, for example, a patch program to be applied to the IC card 1. The communication unit 33 is an interface for communicating with the terminal apparatus 2. For example, the processor 31 of the host apparatus 3 performs processing for transmitting the patch program, stored in the storage unit 32, that is to be applied to the IC card 1 to the terminal apparatus 2.

Next, management of the patch programs in the IC card 1 will be described.

Figure 3:
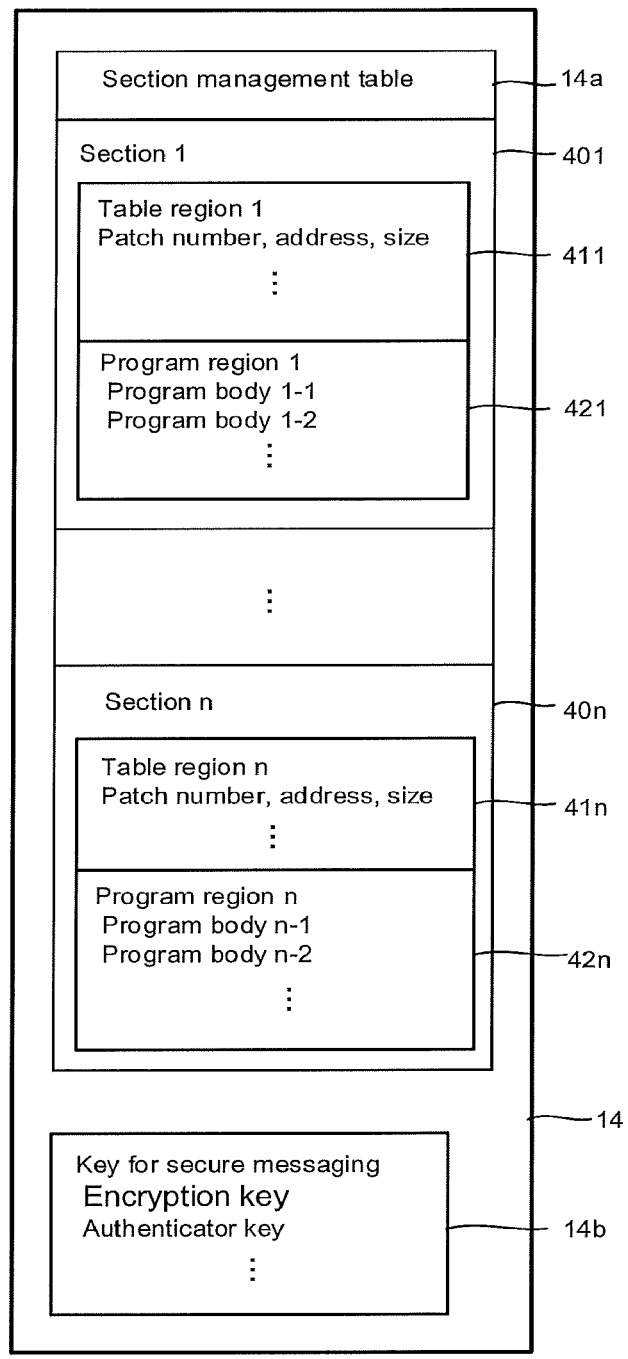
FIG. 3 is a diagram showing an example of information that is stored in a nonvolatile memory of an IC card according to the embodiment.

FIG. 3 is a diagram showing a configuration example of a region to which the patch programs are written in the nonvolatile memory 14 of the IC card 1 according to the embodiment.

As shown in FIG. 3, the nonvolatile memory 14 stores a section management table 14a, and a plurality of section regions (pieces of section information) 40 (401, ..., 40n). The section management table 14a stores information for managing each pieces of section information. The section regions 40 store patch programs. Each section regions 40 (401, ..., 40n) has a table region 41 (411, ..., 41n) and a program region 42 (421, ..., 42n).

The patch programs stored in the section regions 40 are programs to be applied to a program which is preliminarily installed in the ROM 13 or the nonvolatile memory 14. The patch programs are, for example, programs for fixing bugs in a program stored in the ROM 13 or nonvolatile memory 14. The program which is preliminarily stored in the ROM 13 or the nonvolatile memory 14 is configured to apply the patch programs as required, with reference to the information stored in the section management table 14a. For example, information indicating a patch program to be applied (for example, an identification number of the patch program) is set, and the program which is preliminarily stored in the ROM 13 or the nonvolatile memory 14 operates so as to apply the patch program according to that information.

The section management table 14a stores information for managing the patch programs divided among the plurality of section regions (pieces of section information) 40 (401, ..., 40n). In the example shown in FIG. 3, the section management table 14a has n section regions 40 (401, ... 40n) for managing the n patch programs.

The table region 41 of each section region 40 stores a number for identifying the patch program (patch number), and an address and a size of data (program) that is managed in the section. The program region 42 of each section region 40 stores the body of the patch program that is managed in the section.

In addition, as shown in FIG. 3, the nonvolatile memory 14 may also be provided with a region 14b for storing key information for secure messaging. For example, the region 14b stores information indicating a fixed key for secure messaging. The fixed key for secure messaging has an encryption key and an authenticator key. The encryption key is used to encrypt a data section of a command. The authenticator key is used to generate an authenticator for a message. The pieces of key information stored in the region 14b may also be configured to be changed by using a dedicated command.

Figure 4:
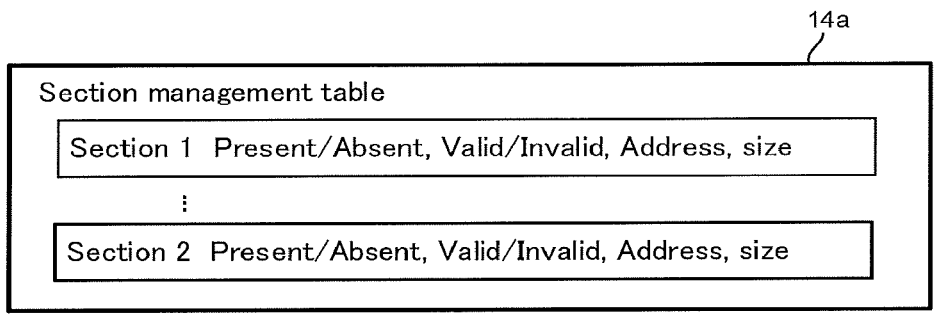
FIG. 4 is a diagram showing an example of a section management table in the IC card according to the embodiment.

FIG. 4 is a diagram for illustrating management information of each section in the section management table 14a.

As shown in FIG. 4, the section management table 14a stores, as information related to each section, information indicating the presence or absence of data (patch program) (Present/Absent), information indicating the validity of the data (Valid/Invalid), information indicating an address of the section region, and information indicating a size of the section region. The information indicating the presence or absence of data and the information indicating the validity of data are information indicating the validity/invalidity of the section. In the case where the information indicating the presence or absence of the data indicates "present" and the information indicating the validity of data indicates "Valid", the section is shown to be valid. The management information managed by the section management table 14a can be rewritten by commands from the terminal apparatus 2. For example, in the case where a new section region 40 is added in response to a section data write command, the management information of the section is added to the section management table 14a. In addition, the section management table 14a is updated in the case where the state of the section regions is changed. For example, the section regions are validated by a section validation command, invalidated by a section invalidation command, and deleted by a section deletion command.

FIGS. 5A to 5D are diagrams showing configuration examples of each type of command for controlling the section information in the section management table 14a.

Figure 5A:
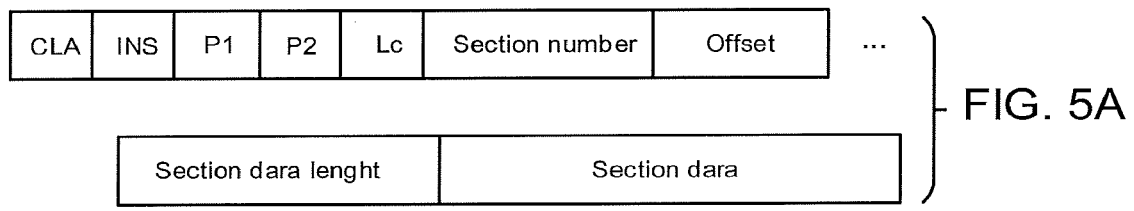
FIGS. 5A to 5D are diagrams each showing a configuration example of a command to be supplied to the IC card according to the embodiment.
Figure 5B:
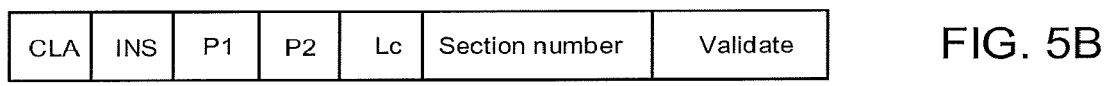
Figure 5C:
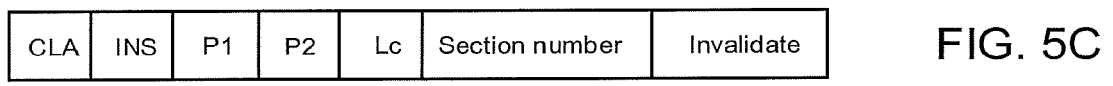
Figure 5D:
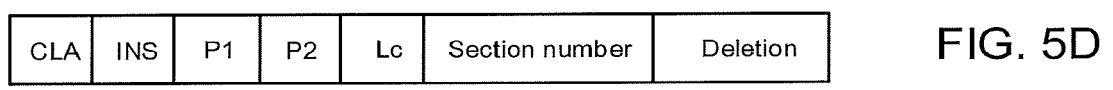

FIG. 5A is a diagram showing a configuration example of a section data write command. FIG. 5B is a diagram showing a configuration example of the section validation command. FIG. 5C is a diagram showing a configuration example of a section invalidation command. FIG. 5D is a diagram showing a configuration example of a section deletion command. The commands shown in FIGS. 5A to 5D are each constituted by CLA, INS, P1, P2, Lc, and a data section.

The section data write command shown in FIG. 5A is a command for requesting writing of a patch program. Upon receiving the section data write command, the IC card 1 sets the designated section information in the section management table 14a to "Present". In the example of the section data write command shown in FIG. 5A, "Section number", "Offset", "Section data (write data) length", and "Section data" are stored in the stated order in the data section.

"Section number" is information indicating the section to be written. "Offset" is information indicating the write start position. "Section data length" is information indicating the length of data to be written by the command. "Section data" is information indicating the data to be written by the command. For example, the section data write command requests processing for writing "Section data" of an amount of "Section data length" from the position of "Offset" in the section region which is designated to be written by the "Section number". Note that the section data may also be data obtained by dividing the patch program as data to be written to the section region, or data for collectively transmitting the entire patch program.

The section validation command shown in FIG. 5B is a command for instructing to validate the designated section. Upon receiving the section validation command, the processor 11 of the IC card 1 sets the management information of the section designated by the command in the section management table 14a to "Valid". In the example of the section validation command shown in FIG. 5B, "Section number" and "Validate" are stored in the stated order in the data section. "Section number" is information indicating the section to be subjected to validation processing. "Validate" is information instructing to validate the section.

The section invalidation command shown in FIG. 5C is a command for instructing to invalidate the designated section. Upon receiving the section invalidation command, the processor 11 of the IC card 1 sets the management information of the section designated by the command in the section management table 14a to "Invalid". In the example of the section invalidation command shown in FIG. 5C, "Section number" and "Invalidate" are stored in the stated order in the data section. "Section number" is information indicating the section to be subjected to invalidation processing. "Invalidate" is information instructing to invalidate the section.

The section deletion command shown in FIG. 5D is a command for instructing to delete the designated section. Upon receiving the section deletion command, the processor 11 of the IC card 1 sets the management information of the section designated by the command in the section management table 14a to "None". In the example of the section deletion command shown in FIG. 5D, "Section number" and "Delete" are stored in the stated order in the data section. "Section number" is information indicating the section to be subjected to deletion processing. "Deletion" is information instructing to delete the section.

Next, a secure messaging command will be described. Each of the commands shown in FIGS. 5A to 5D may also be configured so as to be transmitted and received as a secure messaging command. The secure messaging command is generated as a command in which the message (the data section of the command) is encrypted with an encryption key and to which an authenticator for the message is added. The key for secure messaging may be a session key to be exchanged in mutual authentication, or a fixed key such as shown in FIG. 3.

Figure 6:
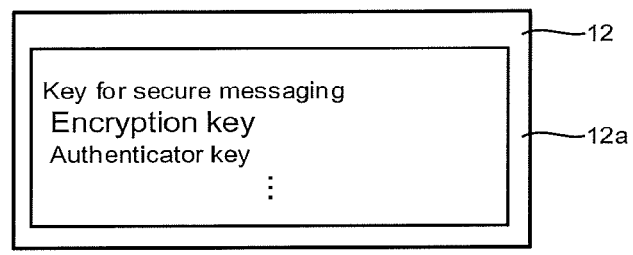
FIG. 6 is a diagram showing an example of a session key according to the embodiment.

FIG. 6 is a diagram showing an example of the session key for secure messaging stored in the RAM 12 of the IC card 1.

The session key for secure messaging includes an encryption key and an authenticator key. The encryption key is used to encrypt or decrypt the data section of the command. The authenticator key is used to generate an authenticator for a message. Since these session keys are generated or exchanged every session by a dedicated command from the terminal apparatus 2 to the IC card 1, the session keys are rewritten each time. The session keys are stored in the RAM 12 of the IC card 1 and in the RAM 26 of the terminal apparatus 2, and used for secure messaging between the IC card 1 and the terminal apparatus 2.

Figure 7:
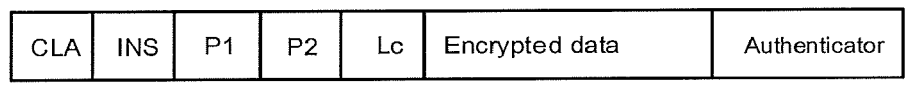
FIG. 7 is a diagram showing a configuration example of a secure messaging command to be supplied to the IC card according to the embodiment.

FIG. 7 is a diagram showing an example of a command which has been converted for secure messaging (secure messaging command).

The secure messaging command has an encrypted data section and an authenticator. The key used for secure messaging may be the above-mentioned session key, or a fixed key such as shown in FIG. 3. By applying secure messaging, the commands shown in FIGS. 5A to 5D become a secure messaging command such as shown in FIG. 7. In a secure messaging command such as shown in FIG. 7, the contents of the data section cannot be known from outside due to the encryption, and tampering of the data can be detected by the authenticator.

For example, it is necessary to fulfill an access condition before executing the commands shown in FIGS. 5A to 5D. For this reason, the IC card 1 and the terminal apparatus 2 perform mutual authentication to establish the access condition. The IC card 1 and the terminal apparatus 2 exchange session keys in the mutual authentication. Using this session key, the terminal apparatus 2 performs encryption of the message (the data in the data section) for each command and adds the authenticator to the message to generate a secure messaging command. The IC card 1 interprets the secure messaging command from the terminal apparatus 2 with the session key.

Figure 8:
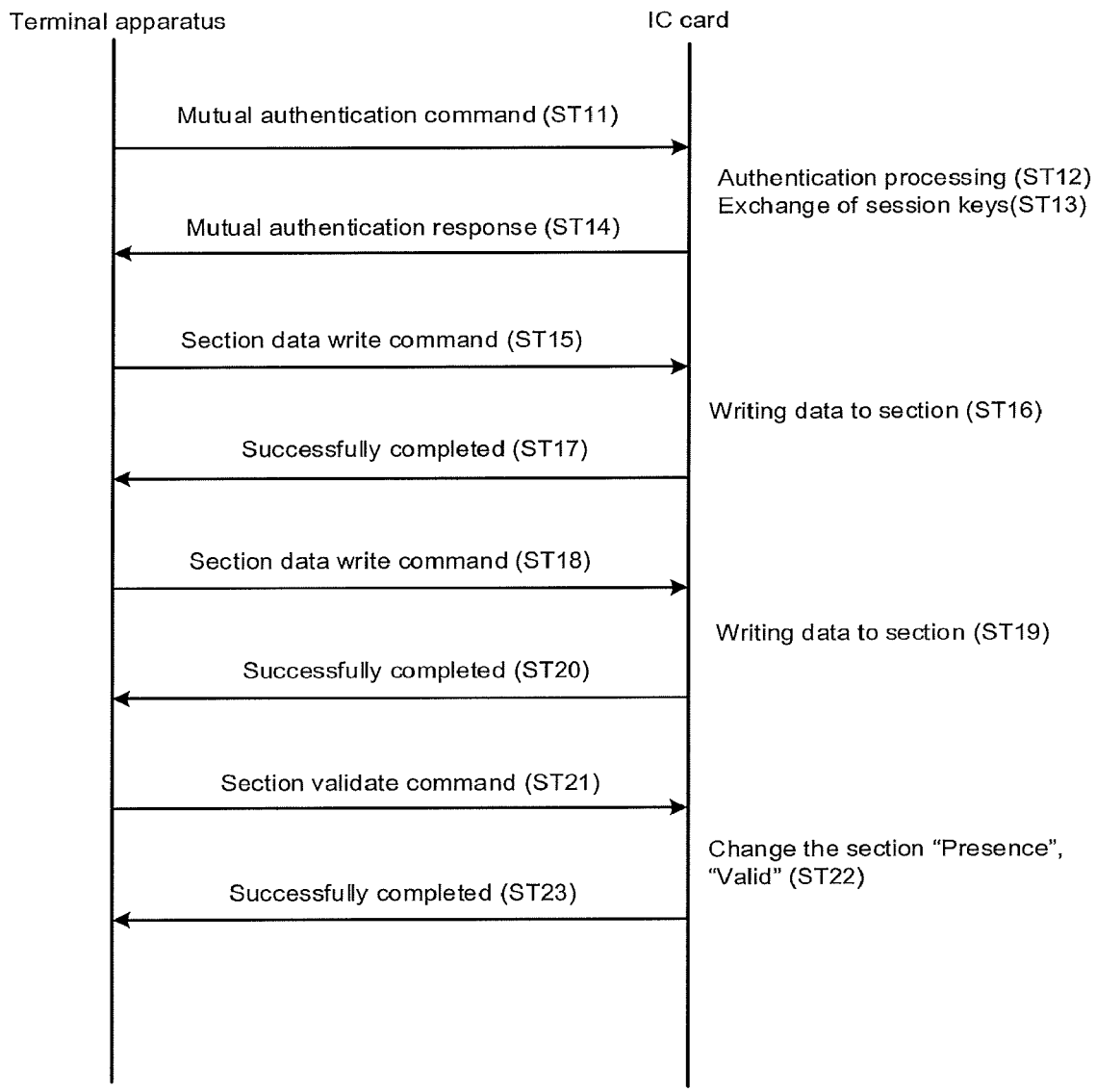
FIG. 8 is a sequence showing a flow of processing for applying a patch to an IC card by a terminal apparatus and the IC card according to the embodiment.

FIG. 8 shows a sequence for illustrating the flow of processing for writing a patch program (patch application processing) from the terminal apparatus 2 by the IC card 1 according to the embodiment.

FIG. 8 shows commands and responses that are transmitted and received between the IC card 1 and the terminal apparatus (IC card processing apparatus) 2 in the patch application processing.

First, the terminal apparatus 2 and the IC card 1 perform mutual authentication and exchange session keys (ST11 to ST14). That is, the processor 25 of the terminal apparatus 2 sends a mutual authentication command to the IC card 1 (ST11), and starts the mutual authentication. Upon receiving the mutual authentication command, the processor 11 of the IC card 1 executes mutual authentication with the terminal apparatus 2 corresponding to the mutual authentication command (ST12). In this mutual authentication, the IC card 1 and the terminal apparatus 2 exchange the session keys to be used for secure messaging (ST13). When the mutual authentication is completed, the processor 11 of the IC card 1 transmits a response to the mutual authentication command to the terminal apparatus 2 (ST14). Here, it is assumed that the mutual authentication was successful and that the processor 11 of the IC card 1 transmits a response indicating that authentication was successful to the terminal apparatus 2.

Note that, although the operation example shown in FIG. 8 shows the terminal apparatus 2 and the IC card 1 performing mutual authentication and exchanging session keys, the IC card 1 and the terminal apparatus 2 may also perform secure messaging by using a fixed key instead of the session keys.

When the mutual authentication is completed, the terminal apparatus 2 and the IC card 1 execute write processing for writing a patch program to the IC card 1 (ST15 to ST20). The patch program is supplied from the host apparatus 3 to the terminal apparatus 2. The terminal apparatus 2 may write the patch program to the IC card 1 with a plurality of write commands, or may write the patch program with one write command. For example, the terminal apparatus 2 may also determine the number of write commands to supply to the IC card 1 according to on the length (size) of the patch program. In FIG. 8, an operation example in which writing of a patch program to a section region is completed with two write commands is shown.

That is to say, when the mutual authentication is completed, the processor 25 of the terminal apparatus 2 generates a section data write command for applying the patch program supplied from the host apparatus 3 to the IC card 1. Here, it is assumed that the patch program from the host apparatus 3 is written to the IC card 1 with two write commands (first and second section data write commands). The processor 25 of the terminal apparatus 2 generates the first section data write command and the second section data write command for the patch program to be applied to the IC card 1.

When the first section data write command has been generated, the processor 25 of the terminal apparatus 2 transmits the generated first section data write command to the IC card 1 (ST15). Upon receiving the first section data write command, the processor 11 of the IC card 1 adds a section region to be managed by the section management table 14a, and writes information corresponding to the received command into the added section region (ST16).

Here, a section number is assumed to be set for each section in the chronological order. In this case, upon receiving the first section data write command, the processor 11 adds a section region 40 to which a new section number obtained by incrementing (+1) the last (latest) section number managed by the current section management table 14a is added. Upon adding the new section region 40, the processor 11 writes information such as the patch number, the starting address, and the like, to the table region 41 of the added section region 40, and writes the program body to be stored in the data section of the command to the program region 42.

Note that, in the case where the received command is a secure messaging command, the processor 11 decrypts the data section of the command by using the encryption key of the session key or the encryption key of the fixed key, and checks the validity of the command with the authenticator by using the authentication key. The processor 11 performs write processing such as described above, based on the data obtained by decrypting the data section of the command whose validity has been checked.

Upon completing the write processing corresponding to the first section data write command, the processor 11 transmits a response indicating that writing corresponding to the command was successfully completed to the terminal apparatus 2 (ST17). In this response, the section number indicating the section to which the data has been written (the added section) and the like is also notified. Upon receiving the response indicating successful completion with respect to the first section data write command from the IC card 1, the processor 25 of the terminal apparatus 2 transmits the second section data write command to the IC card 1 (ST18).

Upon receiving the second section data write command, the processor 11 of the IC card 1 writes information corresponding to the received command to the section added in response to the first section data write command in ST16 (ST19). For example, the processor 11 adds program data stored in the data section of the second section data write command to the program region 42 of the added section region 40. Upon completing the write processing corresponding to the second section data write command, the processor 11 transmits a response indicating that writing of data to the section was successfully completed to the terminal apparatus 2 (ST20).

Upon receiving the response indicating successful completion with respect to the second section data write command from the IC card 1, the processor 25 of the terminal apparatus 2 determines writing of the patch program as section data has been completed.

Upon the completion of writing the patch program, the terminal apparatus 2 and the IC card 1 perform processing for validating the section to which the patch program has been written by the first and second section data write command (ST21 to ST23).

That is, upon determining that writing of the patch program as the section data has been completed, the processor 25 of the terminal apparatus 2 transmits a section validation command for validating the section to which the patch program has been written by the first and second section data write command (ST21). For example, the processor 25 generates the section validation command, by setting the section number indicating the section to which the data has been written in the section validation command as shown in FIG. 5B.

Upon receiving the section validation command, the processor 11 of the IC card 1 validates the section having the section number designated by the section validation command (ST22). For example, the processor 11 writes information indicating that data is present ("Present") and information indicating that the data is valid ("Valid"), as the management information of the section having the section number designated by the section validation command in the section management table 14a. Thus, in the IC card 1, the section storing the patch program is validated. Upon validating the designated section, the processor 11 transmits a response indicating that validation of the section was successfully completed to the terminal apparatus 2 (ST23).

By the above patch application processing, the application of the patch program from the terminal apparatus 2 to the IC card 1 is completed.

Note that, as a modification example of the patch application processing shown in FIG. 8, it is also possible to omit the processing of ST21 to 23 by validating the section to which the IC card 1 has written the data upon the completion of the writing in ST19. For example, the processor 11 of the terminal apparatus 2 adds information indicating that the last data of the patch program (that is, the last data to be written to the section) is included (or information indicating that writing of the patch program has ended) to the second section data write command. Thereby, based on information included in the second section data write command, the processor 11 of the IC card 1 can determine that writing of data to the section has ended. Based on this determination, the processor 11 may update the management information of that section in the section management table 14*a* to show that the data is "Present" and "Valid".

Also, in the above modification example, it is also possible for the terminal apparatus 2 to designate the length of a patch program whose writing is requested with a plurality (two) of the write commands (the size of the data to be written to the program region 42) in the first section data write command. In this case, the IC card 1 may also determine that writing of data to the section added in response to the plurality of commands has ended, when the length of data written to the program region 42 of that section has reached the designated length of the patch program.

In the above patch application processing, it is necessary to realize the write processing of the patch program managed by the section management table by write processing having consistency. That is, each section managed by the section management table should be either in the state before writing a patch program or in the state after writing a patch program. In the management information of each section managed by the section management table, the information indicating the presence or absence ("present" or "absent") of data (patch program) and information indicating the validity of data ("Valid" or "Invalid") are updated in the patch application processing.

In the management information of each section in the section management table, the state before writing is "Absent" and "Invalid", and the state after writing is "Present" and "Valid". For example, even if a problem such as power interruption occurs during the write processing, the management information is controlled to be in the state before writing ("Absent" and "Invalid"), not to be in an irregular state such as "Absent" and "Valid", for example. Note that, in cases such as where it is desired to temporarily invalidate a certain patch program after the patch application processing, the management information of that section managed by the section management table may be in the state "Present" and "Invalid".

Next, an operation for executing the patch program in the IC card 1 (patch processing) will be described.

Figure 9:
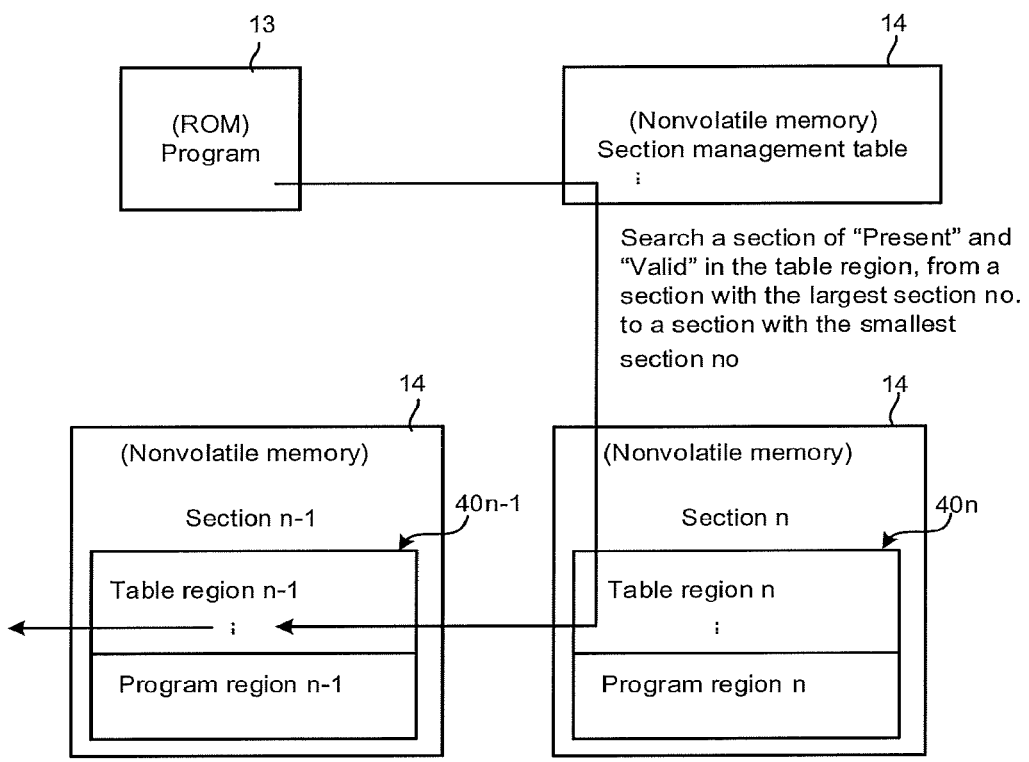
FIG. 9 is a schematic diagram for illustrating patch processing in the IC card according to the embodiment.

FIG. 9 is a diagram schematically showing an operation for executing a patch program (patch processing) in the IC card 1. The example shown in FIG. 9 shows an operation for executing a patch program on a program (the first program) stored in the ROM 13 during the execution of the program.

That is, it is assumed that, in the program preliminary stored in the ROM 13 or the nonvolatile memory in the IC card 1, a location at which the processing moves to the patch program is set. If it is determined to move to the patch program during the execution of the program stored in the ROM 13 (the first program), the processor 11 searches for a valid section, and further search for a patch program to be applied to the program corresponding to that section, with reference to the section management table 14*a* provided in the nonvolatile memory 14. In the operation example shown in FIG. 9, it is assumed that the section management table 14*a* manages a plurality of sections having section numbers 1 to n (n is natural number).

The processor 11 starts searching from the section with the largest section number in the section management table 14*a*. In the above application example of the patch program, the new patch program is always stored in the added section (the section with the largest section number). Thereby, the processor 11 searches each section for a valid section in order from the section with the largest section number (the latest section) to the section with the smallest section number (the oldest section).

For example, if the patch program stored in the latest section is not a patch program that is to be applied to the program being executed, the processor 11 checks the section with the next smallest section number. That is to say, if a patch program corresponding to the program being executed is not found, the processor 11 searches the section with the next smallest section number. If a patch program corresponding to the program being executed is ultimately not found even after checking the section with the section number 1, the processor 11 determines that there is no patch program to be applied. If a patch program corresponding to the program being executed is found, the processor 11 executes the patch program stored in the program region of the section.

Figure 10:
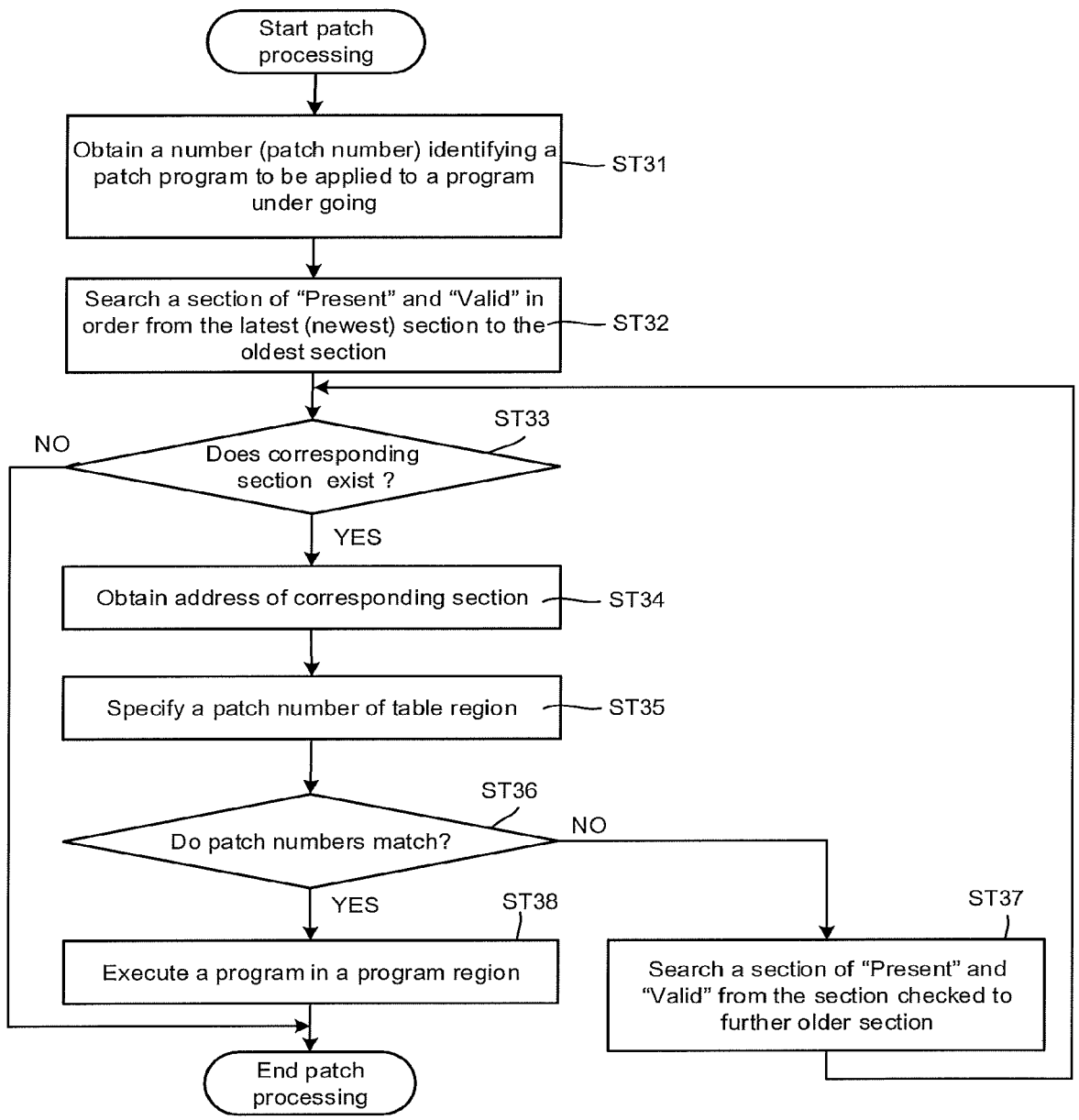
FIG. 10 is a flowchart for illustrating patch processing in the IC card according to the embodiment.

FIG. 10 is a flowchart for illustrating an operation example of the patch processing in the IC card 1.

The processor 11 of the IC card 1 determines if patch processing on the program (first program) stored in the ROM 13 or the nonvolatile memory 14 is required or not during execution of the program. For example, the processor 11 determines to start the patch processing by processing that is called from the location that requires patch processing set in the program being executed.

The patch program applied to the program is identified by a patch number. The patch number may be obtained, for example, by using the INS of the command supplied to the IC card 1 from the terminal apparatus 2. It is also possible to set a number of an entry point in the program and obtain the entry point number as the patch number. Upon starting the patch processing, the processor 11 obtains a number for identifying the patch program (called the patch number) to be applied to the program being executed (first program) (ST31). Here, for example, the processor 11 obtains the entry point number set in the program being executed as the patch number. Upon obtaining the patch number, the processor 11 searches for the section storing the patch program to be executed, with reference to the section management table 14*a*.

Upon starting the search for the patch program, the processor 11 searches for a section in which the patch program is valid (i.e., valid section) in the section management table 14*a*, in descending order from the section with the largest section number. For example, the processor 11 checks whether data is present ("Present") and the data is valid ("Valid") or not in the table region of each section, in descending order from the section with the largest section number, and determines whether the section is valid or not.

In the case where it is determined that there is no section in which data is "Present" and "Valid" in the section management table 14*a* (ST33, NO), the processor 11 terminates the patch processing on the program being executed.

In the case where the processor 11 detects a section in which data is "Present" and "Valid" (ST33, YES), the processor 11 obtains an address indicating the corresponding section region (section information) 40 from the corresponding section management information in the section management table 14*a* (ST34).

When the processor 11 obtains the address of the section region 40, the processor 11 accesses the section region 40 according to the obtained address, and specifies the patch number stored in the table region 41 of the section region 40 (ST35). When the processor 11 specifies the stored patch number stored in the table region 41, the processor 11 determines whether the patch number stored in the table region 41 matches the patch number of the patch program to be applied to the program being executed (ST36).

In the case where the patch numbers match each other (ST36, YES), the processor 11 executes the patch program stored in the program region 42 of that section region 40 (ST38), and terminates the patch processing.

In the case where the patch numbers do not match each other (ST36, NO), the processor 11 searches for a section in which the patch program is valid, in order from the section with the section number which is smaller than the section number of the section which has been checked (ST37). Then, the processor 11 returns from ST37 to ST33, and performs the above processing based on the result of the search processing in ST37.

As described above, in the IC card according to the embodiment, the region storing the patch program to be applied to a program which is preliminarily installed in the ROM or the nonvolatile memory is a section consisting of a table region and a program region, and each section is managed based on the management information of the management table. The IC card according to the embodiment searches for the patch program to be applied to the program being executed with reference to the management information of the management table, and executes the found patch program.

Thereby, the IC card according to the present embodiment can reliably apply patch programs to software programs including the OS during operation, rather than downloading and adding applications. That is, in the IC card according to the present embodiment, patch programs that aim to fix bugs and the like can be reliably applied to preliminarily installed programs including the OS.

Furthermore, the IC card according to the present embodiment validates each section based on the management information in the management table after storage of a patch program in the section has been completed. Thereby, in the IC card according to the present embodiment, patch programs that are added are applied in order so as to update each program.

In addition, in the IC card according to the present embodiment, even if a disturbance such as power interruption occurs during write processing of a patch program (patch application), it is possible to treat section data (patch program) with respect to which write processing has not been completed as invalid data. Accordingly, the IC card prevents patch processing (operation) using incomplete data (patch program) from being performed, and can return to the state before writing where operation was being reliably performed.

According to the present embodiment, it is possible to provide an electronic apparatus, an IC card, and an information processing system that are capable of reliably applying a patch program to a program.

Note that the functions described in the above embodiment may also be realized by causing a computer to load a program in which the functions are written by using software, rather than being limited to a configuration using hardware. Furthermore, it is also possible to configure each function by selecting software or hardware as appropriate.

Although an embodiment of the present invention has been described above, this embodiment is provided as an example and not intended to limit the scope of the invention. This novel embodiment can be implemented in other various ways, and various omissions, substitutions, and changes are possible without departing from the spirit of the invention. This embodiment and modifications thereof are embraced within the scope and spirit of the invention, and are also embraced within the scope of the invention recited in the claims and the range of equivalency of the claims.

What is claimed is:

1. An IC card comprising:
   a communication controller configured to communicate with a terminal apparatus;
   a first memory configured to store a first program;
   a second memory configured to store, for each of a plurality of sections, a patch program for the first program, the patch program being received from the terminal apparatus via the communication controller; and
   a controller configured to include a hardware circuit and to apply, in a case of executing the first program, a latest patch program stored in the sections in the second memory, wherein
   the second memory is configured to store:
      information indicating presence of the patch program for each of the sections as management information,
      information indicating absence of the patch program for each of the sections as the management information,
      information indicating validity of the patch program for each of the sections as the management information, and
      information indicating invalidity of the patch program for each of the sections as the management information, and
   the controller is configured to:
      set the management information of a section designated by a section data write command from the terminal apparatus, to presence,
      set the management information of a section designated by a section validation command from the terminal apparatus, to validity,
      set the management information of a section designated by a section invalidation command from the terminal apparatus, to invalidity,
      set the management information of a section designated by a section deletion command from the terminal apparatus, to absence, and
      specify an appropriate section, which stores a patch program whose presence and validity are indicated by the management information, as containing a valid patch program to be applied to the first program.

2. The IC card according to claim 1, wherein a section number is set to each section in chronological order of storing the patch program to a respective section.

3. The IC card according to claim 2, wherein the controller, upon receiving a new patch program via the communication controller, adds a new section to be managed using the management information, and stores the received new patch program to the new section with a largest section number.

4. The IC card according to claim 2, wherein the controller searches the sections existing in the second memory with reference to the management information, in order from the largest section number to a smallest section number, for a section which stores the patch program whose presence and validity are indicated by the management information.

5. The IC card according to claim 1, wherein the controller receives the patch program from the terminal apparatus after authentication with the terminal apparatus is successfully performed.

6. The IC card according to claim 1, wherein the controller exchanges session keys in authentication with the terminal apparatus, and receives the patch program from the terminal apparatus by secure messaging that uses the session keys.

7. The IC card according to claim 1, further comprising:
a third memory that stores a fixed key,
wherein the controller receives the patch program from the terminal apparatus by secure messaging that uses the fixed key.

8. The IC card according to claim 1, further comprising:
a chassis having the communication controller, the first memory, the second memory, and the controller; and
a housing in which the chassis is embedded.

9. The IC card according to claim 1, wherein, before storing the patch program to a section of the sections, the management information of the section indicates absence and invalidity.

10. The IC card according to claim 1, wherein before storing the patch program to a section of the sections, the management information of the section indicates absence and invalidity.

11. An information processing system comprising a terminal apparatus and an IC card, wherein
the terminal apparatus includes:
a first communication controller configured to communicate with the IC card; and
a first controller configured to include a hardware circuit and to transmit a patch program that is to be applied to a program in the IC card to the IC card via the first communication controller,
the IC card includes:
a second communication controller configured to communicate with the terminal apparatus;
a first memory configured to store the program to which the patch program transmitted from the terminal apparatus is to be applied;
a second memory configured to store, for each of a plurality of sections, the patch program received from the terminal apparatus via the second communication controller; and
a second controller configured to include a hardware circuit and to apply, in a case of executing the first program, a latest patch program stored in the sections in the second memory,
the second memory is configured to store:
information indicating presence of the patch program for each of the sections as management information,
information indicating absence of the patch program for each of the sections as the management information,
information indicating validity of the patch program for each of the sections as the management information, and
information indicating invalidity of the patch program for each of the sections as the management information, and
the second controller is configured to:
set the management information of a section designated by a section data write command from the terminal apparatus, to presence,
set the management information of a section designated by a section validation command from the terminal apparatus, to validity,
set the management information of a section designated by a section invalidation command from the terminal apparatus, to invalidity,
set the management information of a section designated by a section deletion command from the terminal apparatus, to absence, and
specify an appropriate section, which stores a patch program whose presence and validity are indicated by the management information, as containing a valid patch program to be applied to the first program.

12. The information processing system according to claim 11, wherein
the terminal apparatus further includes:
a third communication controller configured to communicate with a host apparatus, and
the first controller receives the patch program that is to be applied to a program in the IC card from the host apparatus via the third communication controller, and transmits the patch program received from the host apparatus to the IC card via the first communication controller.

* * * * *